(12) United States Patent
Cheng et al.

(10) Patent No.: US 11,461,856 B1
(45) Date of Patent: Oct. 4, 2022

(54) COMPARING FINANCIAL TRANSACTIONS OF A SOCIAL NETWORKING SYSTEM USER TO FINANCIAL TRANSACTIONS OF OTHER USERS

(71) Applicant: Meta Platforms, Inc., Menlo Park, CA (US)

(72) Inventors: Loren Alfred Cheng, Sunnyvale, CA (US); Edward Zagat, Menlo Park, CA (US)

(73) Assignee: Meta Platforms, Inc., Menlo Park, CA (US)

(*) Notice: Subject to any disclaimer, the term of this patent is extended or adjusted under 35 U.S.C. 154(b) by 512 days.

(21) Appl. No.: 16/566,792

(22) Filed: Sep. 10, 2019

Related U.S. Application Data

(63) Continuation of application No. 13/760,809, filed on Feb. 6, 2013, now Pat. No. 10,453,152.

(51) Int. Cl.
*G06Q 40/00* (2012.01)
*G06Q 50/00* (2012.01)

(52) U.S. Cl.
CPC .................................. *G06Q 50/01* (2013.01)

(58) Field of Classification Search
None
See application file for complete search history.

(56) References Cited

U.S. PATENT DOCUMENTS

| | | |
|---|---|---|
| 8,583,523 B2 | 11/2013 | Manfredi et al. |
| 2002/0173986 A1 | 11/2002 | Lehew et al. |
| 2006/0218087 A1 | 9/2006 | Zimmerman |
| 2012/0221400 A1 | 8/2012 | Tietzen |
| 2012/0239479 A1 | 9/2012 | Amaro et al. |

*Primary Examiner* — Chia-Yi Liu
(74) *Attorney, Agent, or Firm* — Fenwick & West LLP

(57) ABSTRACT

A social networking system obtains financial transaction activity for its users and allows its users to obtain reports of their spending compared to various benchmarks. The benchmarks may be for various demographic groups, networks to which the user belongs, groups of users connected to a user, or any other suitable grouping of users. The social networking system may also forecast a user's spending on a category based on the spending of other users who have similar spending profiles in other categories.

6 Claims, 5 Drawing Sheets

200

COMPARING FINANCIAL TRANSACTIONS OF A SOCIAL NETWORKING SYSTEM USER TO FINANCIAL TRANSACTIONS OF OTHER USERS

CROSS REFERENCE TO RELATED APPLICATIONS

This application is a continuation of co-pending U.S. application Ser. No. 13/760,809, filed Feb. 6, 2013, which is incorporated by reference in its entirety.

BACKGROUND

The present disclosure generally relates to social networking systems and more specifically to analyzing financial transaction habits of social networking system users.

Social networks, or social utilities that track and enable connections between users (including people, businesses, and other entities), have become prevalent in recent years. In particular, a social networking system allows users to more efficiently communicate information that is relevant to their friends or other connections in the social network. Social networks typically incorporate a system for maintaining connections among users in the social network and links to content that are likely to be relevant to the users. Social networks also collect and maintain information about the users of the social network. This information may be static, such as geographic location, employer, job type, age, music preferences, interests, and a variety of other attributes, or it may be dynamic, such as tracking a user's actions within the social network.

Additionally, a social networking system may receive information describing its users' interactions with entities external to the social networking system. For example, social networking system users may purchase goods or services from vendors at physical retail locations or using websites associated with the vendors and elect to share this information with the social networking system. Incorporating this external information allows the social networking system to obtain additional information about its users, allowing the social networking system to provide a wider range of information to its users. Because social networking system users are likely to have diverse interests and demographic characteristics, including external information into the social networking system allows further analysis of social networking system users.

SUMMARY

Social networking system users perform a variety of financial transactions both inside and outside of the social networking system. For example, a social networking system user purchases products or services from a vendor via a physical retail location associated with the vendor or from a website associated with the vendor. By storing information describing financial transactions of its users, the social networking system may provide its users with information about their financial habits. For example, the social networking system may compare a user's financial transactions to financial transactions of a group of additional social networking system users. The social networking system may leverage stored information describing demographic information and connections of its users to identify a group of additional users sharing demographic features, interests, or other characteristics with a user, allowing more accurate evaluation of the user's financial transactions.

For example, a transaction history describing financial transactions performed by a social networking system user is retrieved from a financial account provider by the social networking system and associated with the user's user profile. To protect user privacy, one or more privacy settings may be specified by the social networking system user to limit the information from the financial account that is accessible to the social networking system for analysis. The transaction history includes one or more transactions that each have a transaction amount. Additionally, the social networking system may associate one or more transaction categories with a transaction. Transaction categories allow the transactions to be grouped for analysis. In various embodiments, the user, the social networking system, or the financial account provider associate a transaction category with a transaction.

In one embodiment, the social networking system associates transaction categories with transactions based on information in a user profile associated with the user. For example, transaction categories identify interests included in the user's user profile. Examples of interests include: sports, reading, shopping, fine dining, etc. The social networking system may associate transaction categories with a transaction based on interests of the user inferred by the social networking system. The user's interests may be inferred from the browsing history of the user, the pages in the social networking system visited by the user, membership in groups maintained by the social networking system, comments posted by the user within the social networking system, and other suitable actions or objects provided to the system by the user. Alternatively, a transaction category is associated with a transaction by the financial account provider based on a merchant name or a description of the transaction.

The social networking system analyzes a user's transaction history relative to other users of the social networking system. For example, the social networking system identifies a group of other social networking system users having one or more characteristics or connections with the user. For example, the social networking system identifies characteristics of the user from the user profile, allowing the user to select one or more characteristics used to identify a group of other social networking system users having the selected one or more characteristics. Examples of characteristics include: demographic information (e.g., age, gender, ethnicity, race, etc.), location (e.g., birthplace, current city or state of residence, etc.), education level, occupation, or any other suitable characteristic.

After identifying the group of other users based on one or more characteristics of the user, the social networking system retrieves transaction histories associated with each of the other users in the group. The user's transaction history is compared to the transaction histories of the group of other users and the comparison results are presented to the user. In one embodiment, the comparison normalizes transactions associated with the user and/or with the group of user (for example, on a per user basis), and presents the normalized information along with a comparison between the user's transactions and transactions of the group of other users. Because the users in the group of other users are selected based on characteristics of the user, the likelihood of the transaction histories of the group of users being relevant to transactions of the user is increased. This provides the user with more relevant information about its transactions.

A budget amount for a transaction category may be generated for a user based on transaction histories of other social networking system users. The user may select a transaction category and one or more supplemental transaction categories from the user's transaction history as identified either by the user or by the social networking system. Transaction amounts associated with one or more of the supplemental transaction categories are determined from the user's transaction history and compared to transaction amounts associated with the supplemental transaction categories from transaction histories of additional users. Transaction histories for additional users having transaction amounts associated with the supplemental transaction categories within a threshold amount of the transaction amounts associated with the supplemental transaction categories from the user's transaction history are identified. Based on transaction amounts associated with the identified transaction category in the transaction histories for the additional users, a budget amount for the identified transaction category is generated.

In another embodiment, the social networking system notifies the user of products that may be of particular interest to the user and that are also the subject of financial transactions of some or all of the users in one or more groups of additional users sharing characteristics with the user. The social networking system determines product to recommend to the user, for example, by removing routinely purchased products from the analysis, identifying the remaining products that are the subject of financial transactions of the additional users, further identifying social objects associated with the products, and/or limiting the products based on characteristics shared between the user and the one or more groups of additional users.

The figures depict various embodiments of the present invention for purposes of illustration only. One skilled in the art will readily recognize from the following discussion that alternative embodiments of the structures and methods illustrated herein may be employed without departing from the principles of the embodiments described herein.

DETAILED DESCRIPTION

Overview

The described embodiments enable a social networking system to retrieve and compare a user's financial transaction history with financial transaction histories of a group of social networking system users having one or more characteristics in common with the user. For example, the group of social networking system users has a threshold number of characteristics and/or interests in common with the user. Identifying a group of users having characteristics and/or interests in common with the user increases the relevance of the comparison to the user. A reference to the term "product" is not limited to physical goods but includes various types of goods and services, charity donations, gift cards, memberships of organizations, tickets to events, media including music, videos, movies, etc.

Figure 1:
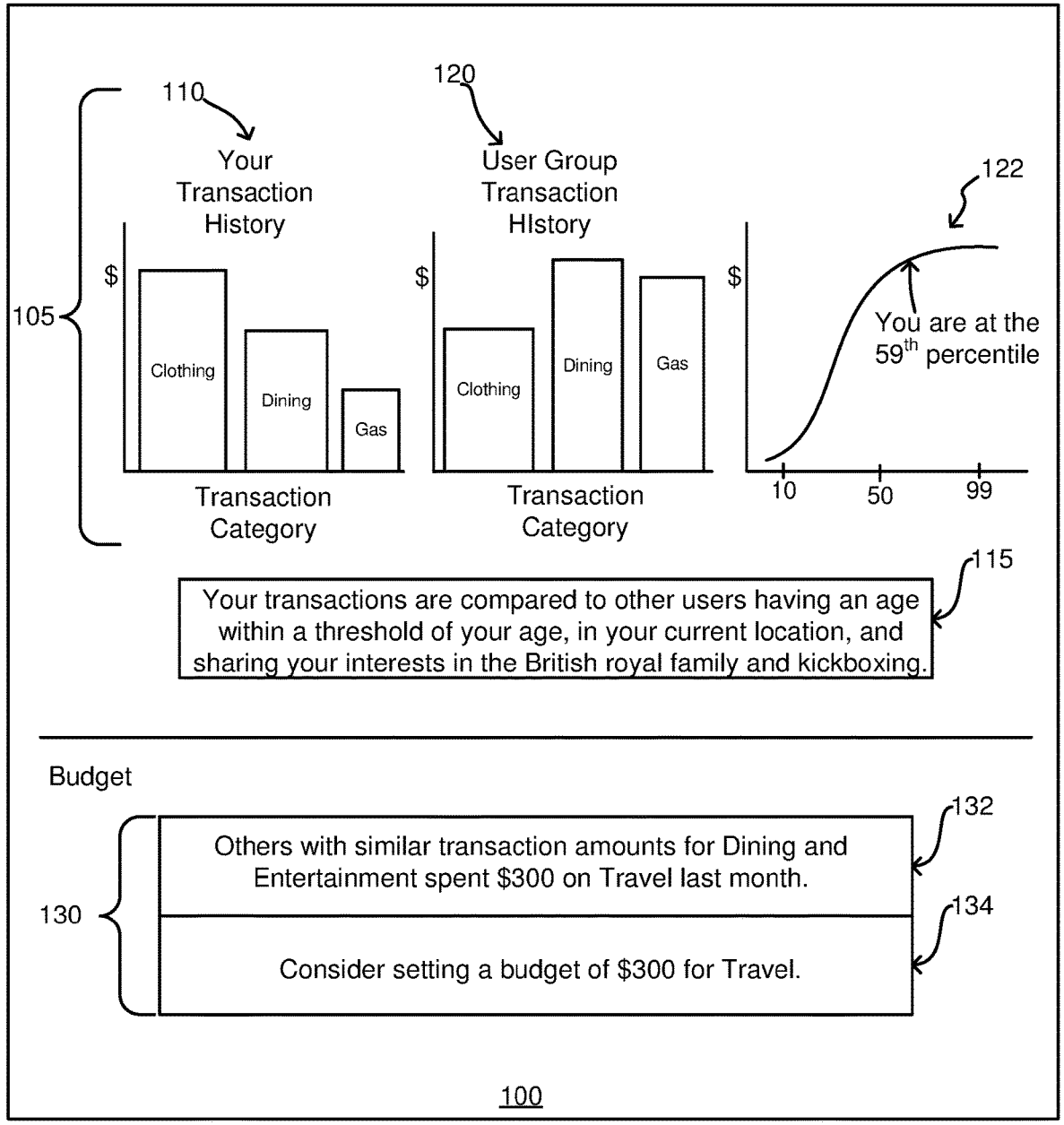
FIG. 1 is an example user interface presenting a comparison of a social networking system user's financial transactions to financial transactions of other social networking system users selected based on the user's characteristics, in an embodiment of the invention.

FIG. 1 illustrates an example of a user interface 100 presenting a comparison of a social networking system user's financial transactions to financial transactions of other social networking system users selected based on the user's characteristics. As shown in FIG. 1, the user interface 100 includes a transaction history comparison 105 and a budget recommendation 130. The transaction history comparison 105 presents information describing a social networking system user's financial transactions over a time interval (a "transaction history") and information describing financial transactions of a group of social networking system users over the time interval. As further described below, the social networking system receives account identifiers and/or security credentials from its users and uses the account identifiers and/or security credentials to retrieve transaction histories from financial account providers maintaining financial accounts of users.

A user's transaction history includes a transactions made by the user that involve a financial account associated with the user. For example, a transaction history from a credit card provider describes purchases a user made with the corresponding credit card. In one embodiment, each transaction in a transaction history represents a purchase, withdrawal, deposit or other action affecting a financial account. A transaction includes a transaction amount specifying the amount of money involved in the transaction. Additionally, a transaction may be associated with one or more transaction categories. In various embodiments, the transaction categories may be associated with transactions by the social networking system based on information associated with the user by the social networking system. For example, transaction categories identify interests included in the user's user profile. Examples of interests include: sports, reading, shopping, fine dining, etc. A user's interests may be inferred from browsing history of the user, the pages in the social networking system visited by the user, membership in groups maintained by the social networking system, comments posted by the user within the social networking system, and other suitable actions or objects provided to the system by the user. Alternatively, a transaction category is associated with a transaction by the financial account provider based on a merchant name or a description of the transaction or is explicitly identified by a user.

In FIG. 1, the transaction history comparison 105 includes a user transaction history display 110 and a user group transaction history display 120. The user transaction history display 110 describes a social networking system user's transactions over a specified time interval. In FIG. 1, the user's transactions are organized based on category, allowing the user to easily view the amounts spent over the time interval in various categories. FIG. 1 shows an example where the user transaction display 110 displays a graph indicating the transaction amounts in various categories (e.g., clothing, dining, and gas) over a time interval. However, in other embodiments, the user transaction display 110 may display the transaction amounts in various categories using any suitable format, such as a bar chart, a table, a pie chart, or other suitable representation.

Similarly, the user group transaction history display 120 presents information describing transactions by a group of social networking system users over a specified time interval. In one embodiment, the time interval used for the user group transaction history display 120 is the same as the time interval used for the user transaction history display 110. To generate the user group transaction history display 120, the social networking system first identifies a group of users having one or more characteristics stored by the social networking system that are in common with the user, or having one or more characteristics similar to those of the user. The system then analyzes the transaction histories associated with the group of users. Alternatively, the social networking system may identify characteristics of the user and select a group of users each having one or more of the identified characteristics. For example, the group of users includes users having a threshold number of interests matching the user and/or living in the same geographic region as the user.

As further described below, the user may specify characteristics, and the group of users is selected to include users having one or more of the user specified characteristics. In one embodiment, the transaction histories associated with the group of users are analyzed to identify one or more of a mean, median and mode of transaction amounts associated with different categories. Additional types of analysis may be performed to the transaction histories associated with users in the group of users to describe transaction amounts in various transaction categories by users in the group of users. The analysis of the transaction amounts of the group of users is presented in the user group transaction history display 120 in any suitable manner (e.g., bar chart, line graph, pie chart, table, etc.).

Furthermore, the user may be provided with a distribution of transaction amounts form the group of other users to provide the user with an understanding of how his financial habits compare to those of his peer group. For example, a display 122 may show a user's spending for a category in the context of a spending distribution for the category of the group of other users. In the example display 122 shown, the spending of the user is in the top 10% of spending of users sharing characteristics with the user.

In alternative embodiments, the transaction history comparison 105 displays differences between the user transaction history and the analyzed transaction histories of the user group. For example, the transaction history comparison 105 displays differences between the user's transaction amount in a category and a transaction amount obtained from the transaction histories of the group of users. This allows the user to readily identify discrepancies between its transactions and transactions of the user group.

By selecting the user group to include users having characteristics in common with the user, the social networking system compares the user's transaction history to transaction histories of users more likely to be similar to the user. This allows the user to better analyze its transactions with respect to transactions by similar users. Conventionally, a user's transaction history is compared to transaction histories for global users or to a generalized demographic of users. By using information associated with users by the social networking system to generate a group of users, the group of users may more closely match the user, increasing the relevance of the transaction histories to which the user's transaction history is compared.

In one embodiment, the user interface 100 includes a user group description 115 specifying the characteristics used to select the group of users. Interacting with the user group description 115 may allow the user to modify the criteria used to select the group of users. Examples of criteria that may be used to identify the group of users include: demographic factors (age, gender, ethnicity, income, education level, occupation, birthplace, location of residence), and/or interests either expressly identified by the user in a user profile maintained by the social networking system or inferred by the social networking system. Additional criteria, such as connections to a specified user or an object created by the user in the social networking system, actions or types of actions, or other suitable data may also be used to specify the user group.

The user interface 100 shown by FIG. 1 also includes a budget recommendation 130 recommending an amount for the user to allocate for transactions in one or more categories. To allow a user to manage the amount spent in a category, the user may associate a budget with a transaction category and receive notifications indicating differences between the transaction amount and the budget. To aid the user in setting a budget for a specified transaction category, the social networking system identifies the user's transaction amounts in various additional categories and identifies transaction histories of other users having similar transaction amounts in the additional categories. By analyzing the transaction amounts associated with the specified transaction category from the transaction histories of the other users, the social networking system generates a budget amount for the specified transaction category. For example, the social networking system determines the budget amount as the average transaction amount associated with the specified category from the transaction histories of the other users.

The budget recommendation 130 presents a description 132 of the information used to select a budget amount. For example, the description 132 identifies the transaction categories used to identify transaction histories of other users. In one embodiment, the user may interact with the description to provide additional transaction categories, remove transaction categories or otherwise modify the transaction categories used to generate the budget amount for a specified category. The budget amount may be presented as a category-specific budget 134 identifying the transaction category and the budget amount. The user may specify a different selected transaction category via the category-specific budget 134 or via any other interface, allowing the social networking system to determine a budget amount for a different transaction category.

Figure 2:
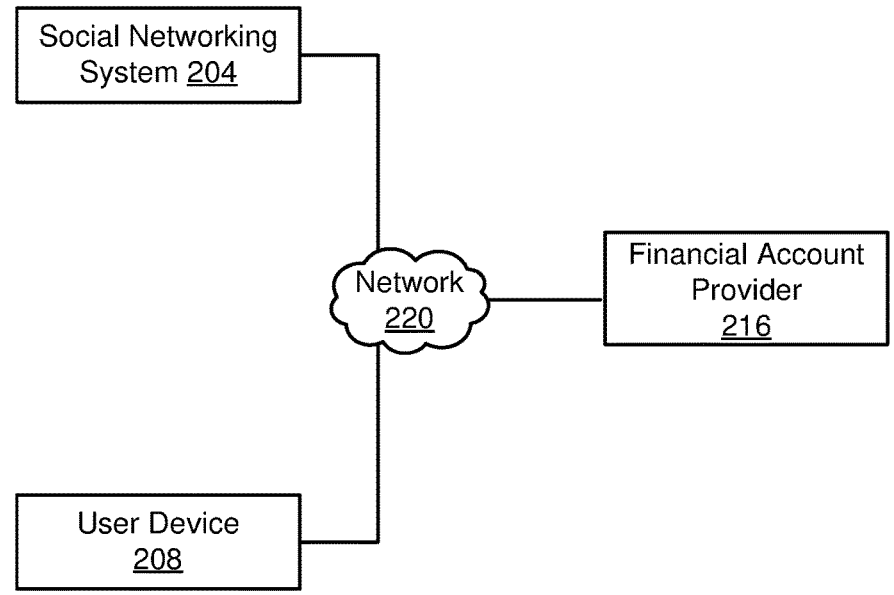
FIG. 2 is a system environment in which a social networking system retrieves and analyzes financial transactions of its users, in an embodiment of the invention.

FIG. 2 is a block diagram of a system environment 200 for a social networking system 204. The system environment 200 shown in FIG. 2 includes a social networking system 204, a user device 208, a financial account provider 216, and a network 220. In other embodiments, the system environment 200 may include different and/or additional components than those shown by FIG. 2.

The social networking system 204, further described below in conjunction with FIG. 3, comprises one or more computing devices storing user profiles associated with users and/or other objects as well as connections between users and other users and/or objects. In use, users join the social networking system 204 and then add connections to other users or objects of the social networking system to which they desire to be connected. As further described below in conjunction with FIG. 2, users of the social networking system 204 may be individuals or entities such as businesses, organizations, universities, manufacturers. The social networking system 204 allows its users to interact with each other as well as with other objects maintained by the social networking system 204. In some embodiments, the social networking system 204 allows users to interact with third-party websites and the financial account provider 216.

Based on stored data about users, objects and connections between users and/or objects, the social networking system 204 generates and maintains a "social graph" comprising a plurality of nodes interconnected by a plurality of edges. Each node in the social graph represents an object or user that can act on another node and/or that can be acted on by another node. An edge between two nodes in the social graph represents a particular kind of connection between the two nodes, which may result from an action that was performed by one of the nodes on the other node. For example, when a user identifies an additional user as a friend, an edge in the social graph is generated connecting a node representing the first user and an additional node representing the additional user. The generated edge has a connection type indicating that the users are friends. As various nodes interact with each other, the social networking system 204 modifies edges connecting the various nodes to reflect the interactions.

A user device 208 is a computing device capable of receiving user input as well as transmitting and/or receiving data via the network 220. In one embodiment, the user device 208 is a conventional computer system, such as a desktop or laptop computer. In another embodiment, the user device 208 may be a device having computer functionality, such as a personal digital assistant (PDA), mobile telephone, smart-phone or similar device. The user device 208 is configured to communicate with the social networking system 204, and/or the financial account provider 216 via the network 220. In one embodiment, the user device 208 executes an application allowing a user of the user device 208 to interact with the social networking system 204. For example, the user device 208 executes a browser application to enable interaction between the user device 208 and the social networking system 204 via the network 220. In another embodiment, a user device 208 interacts with the social networking system 204 through an application programming interface (API) that runs on the native operating system of the user device 208, such as IOS® or ANDROID™.

The user devices 208 are configured to communicate via the network 220, which may comprise any combination of local area and/or wide area networks, using both wired and wireless communication systems. In one embodiment, the network 220 uses standard communications technologies and/or protocols. Thus, the network 220 may include links using technologies such as Ethernet, 802.11, worldwide interoperability for microwave access (WiMAX), 3G, 4G, CDMA, digital subscriber line (DSL), etc. Similarly, the networking protocols used on the network 220 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over the network 220 may be represented using technologies and/or formats including hypertext markup language (HTML) or extensible markup language (XML). In addition, all or some of links can be encrypted using conventional encryption technologies such as secure sockets layer (SSL), transport layer security (TLS), and Internet Protocol security (IPsec).

The financial account provider 216 stores and maintains financial accounts associated with one or more users. A unique financial account identifier is associated with each financial account. Examples of financial accounts include a credit card account, a checking account, a savings account, a transactional account or any other suitable type of account that records financial transactions between the financial account provider 216 and a user associated with the account. The financial account provider 216 maintains a transaction history associated with a financial account that identifies debits and credits to the account. In one embodiment, the transaction history of a financial account includes groupings of a vendor identifier, a date and a transaction amount to identify a monetary amount provided to a vendor associated with the vendor identifier. In another embodiment, the financial account provider 216 not only identifies the above mentioned information associated with the financial transaction, but also identifies the product that is the subject of the financial transaction. The product may be identified using a unique product description (e.g., a SKU or other unique product identifier or description) stored in one or more financial transaction histories.

Social Networking System Architecture

Figure 3:
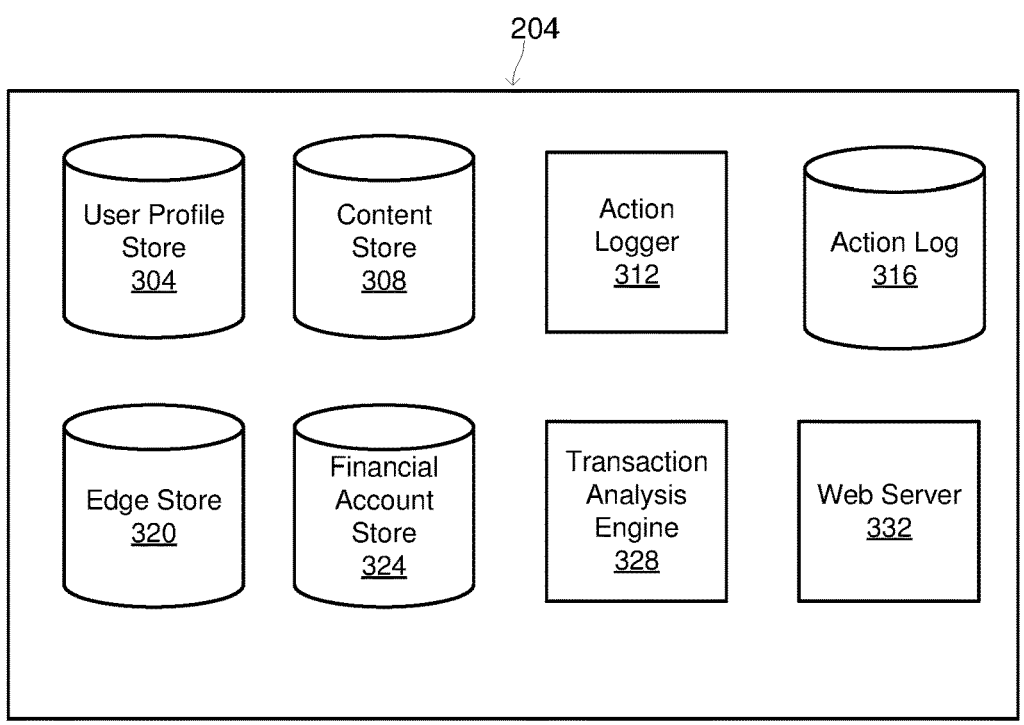
FIG. 3 is a block diagram of a system architecture for a social networking system, in an embodiment of the invention.

FIG. 3 is a block diagram of a system architecture of the social networking system 204. The social networking system 204 shown by FIG. 3 includes a user profile store 304, a content store 308, an action logger 312, an action log 316, an edge store 320, a financial account store 324, a transaction analysis engine 328, and a web server 332. In other embodiments, the social networking system 204 may include additional, fewer, or different modules for various applications. Conventional components such as network interfaces, security mechanisms, load balancers, failover servers, management and network operations consoles, and the like are not shown so as to not obscure the details of the system architecture.

Each user of the social networking system 204 is associated with a user profile, which is stored in the user profile store 304. A user profile includes declarative information about the user that was explicitly shared by the user, and may also include profile information inferred by the social networking system 204. In one embodiment, a user profile includes multiple data fields, each data field describing one or more attributes of the corresponding user of the social networking system 204. The user profile information stored in user profile store 304 describes the users of the social networking system 204, including biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the social networking system 204 displayed in an image. A user profile in the user profile store 304 may also maintain references to actions by the corresponding user performed on content items in the content store 308 and stored in the edge store 320. The user profile store 304 may also maintain references to actions or interactions with objects that are performed on or off of the social network.

As further described below, a user profile may be associated with one or more financial accounts, allowing the user profile to include data retrieved from or derived from a financial account. A user may specify one or more privacy settings, which are stored in the user profile, that limit information from a financial account that the social networking system 204 is permitted to access. For example, a privacy setting limits the social networking system 204 to accessing the transaction history of the financial account and not the current account balance. As another example, a privacy setting limits the social networking system 204 to a subset of the transaction history of the financial account, allowing the social networking system 204 to access transactions within a specified time range, transactions involving less than a threshold transaction amounts, transactions associated with specified vendor identifiers, transactions associated with vendor identifiers other than specified vendor identifiers or any suitable criteria limiting information from a financial account identified by a user that is accessible by the social networking system 204. In one embodiment, information from the financial account is stored in the user profile store 304. In other embodiments, it may be stored in the financial account store 324, which is further described below.

The content store 308 stores content items associated with a user profile, such as images, videos or audio files. Content items from the content store 308 may be displayed when a user profile is viewed or when other content associated with the user profile is viewed. For example, displayed content items may show images or video associated with a user profile or show text describing a user's status. Additionally, other content items may facilitate user engagement by encouraging a user to expand his connections to other users, to invite new users to the system or to increase interaction with the social network system by displaying content related to users, objects, activities, or functionalities of the social networking system 204. Examples of social networking content items include suggested connections or suggestions to perform other actions, media provided to, or maintained by, the social networking system 204 (e.g., pictures or videos), status messages or links posted by users to the social networking system, events, groups, pages (e.g., representing an organization or commercial entity), and any other content provided by, or accessible via, the social networking system.

The content store 308 also includes one or more pages associated with entities having user profiles in the user profile store 304. An entity is a non-individual user of the social networking system 204, such as a business, a vendor, an organization or a university. A page includes content associated with an entity and instructions for presenting the content to a social networking system user. For example, a page identifies content associated with the entity's user profile as well as information describing how to present the content to users viewing the brand page. Vendors may be associated with pages in the content store 308, allowing social networking system users to more easily interact with the vendor via the social networking system 204. A vendor identifier is associated with a vendor's page, allowing the social networking system 204 to identify the vendor and/or to retrieve additional information about the vendor from the user profile store 304, the action log 316 or from any other suitable source using the vendor identifier. In some embodiments, the content store 308 may also store one or more targeting criteria associated with stored objects and identifying one or more characteristics of a user to which the object is eligible to be presented.

The action logger 312 receives communications about user actions on and/or off the social networking system 204, populating the action log 316 with information about user actions. Such actions may include, for example, adding a connection to another user, sending a message to another user, uploading an image, reading a message from another user, viewing content associated with another user, attending an event posted by another user, among others. In some embodiments, the action logger 312 receives, subject to one or more privacy settings, transaction information from a financial account associated with a user and identifies user actions from the transaction information. For example, the action logger 312 retrieves vendor identifiers from the financial account's transaction history and identifies an object, such as a page, in the social networking system associated with the vendor identifier. This allows the action logger 312 to identify a user's purchases of products or services that are associated with a page, or another object, in the content store 308. In addition, a number of actions described in connection with other objects are directed at particular users, so these actions are associated with those users as well. These actions are stored in the action log 316 and/or in the edge store 320.

The action log 316 may be used by the social networking system 204 to track user actions on the social networking system 204, as well as on external websites that communicate information to the social networking system 204. Users may interact with various objects on the social networking system 204, including commenting on posts, sharing links, and checking-in to physical locations via a mobile device, accessing content items in a sequence or other interactions. Information describing these actions is stored in the action log 316. Additional examples of interactions with objects on the social networking system 204 included in the action log 316 include commenting on a photo album, communications between users, becoming a fan of a musician, adding an event to a calendar, joining a groups, becoming a fan of a brand page, creating an event, authorizing an application, using an application and engaging in a transaction. Additionally, the action log 316 records a user's interactions with advertisements on the social networking system 204 as well as other applications operating on the social networking system 204. In some embodiments, data from the action log 316 is used to infer interests or preferences of the user, augmenting the interests included in the user profile and allowing a more complete understanding of user preferences.

The action log 316 may also store user actions taken on external websites and/or determined from a financial account associated with the user. For example, an e-commerce website that primarily sells sporting equipment at bargain prices may recognize a user of a social networking system 204 through social plug-ins that enable the e-commerce website to identify the user of the social networking system 204. Because users of the social networking system 204 are uniquely identifiable, e-commerce websites, such as this sporting equipment retailer, may use the information about these users as they visit their websites. The action log 316 records data about these users, including webpage viewing histories, advertisements that were engaged, purchases made, and other patterns from shopping and buying. Actions identified by the action logger 312 from the transaction history of a financial account associated with the user allow the action log 316 to record further information about additional types of user actions.

In one embodiment, an edge store 320 stores the information describing connections between users and other objects on the social networking system 204 in edge objects. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 204, such as expressing interest in a page on the social networking system, sharing a link with other users of the social networking system, and commenting on posts made by other users of the social networking system. The edge store 320 stores edge objects that include information about the edge, such as affinity scores for objects, interests, and other users. Affinity scores may be computed by the social networking system 204 over time to approximate a user's affinity for an object, interest, and other users in the social networking system 204 based on the actions performed by the user. Multiple interactions between a user and a specific object may be stored in one edge object in the edge store 320, in one embodiment. In some embodiments, connections between users may be stored in the user profile store 304, or the user profile store 304 may access the edge store 320 to determine connections between users.

In one embodiment, the financial account store 324 includes financial account identifiers associated with user profiles and an association between a financial account and its corresponding user profile. A user may include additional information about the financial account in the financial account store, such as the name of a financial account provider 216, a description of the financial account and may also include authentication information for accessing the account such as names, passwords or other security credentials. In embodiments where information about user financial accounts is stored in the financial account store 324, the social networking system 204 may apply additional security measures to the financial account store 324 to reduce the risk of unauthorized access to financial account information. Alternatively, financial account information may be included in the user profile store 304 as data in a user's user profile. One or more privacy settings may be applied to the financial account information to limit its accessibility to objects in the social networking system 204.

Using information in the financial account store 324 and/or in the user profile store 304, the transaction analysis engine 328 retrieves a transaction history associated with a user. The transaction history may be retrieved from the financial account store 324, from the user profile store 304 or from the financial account provider 216. For example, a financial account identifier associated with the user is retrieved from the financial account store 324 or from the user profile store 304 and used, along with security credentials, to retrieve a transaction history associated with the financial account identifier from the financial account provider. As described above in conjunction with FIG. 1, a transaction history includes one or more transactions each having a transaction amount. A transaction may also identify a vendor or other entity, such as an entity to which compensation is provided from a financial account.

Transactions may be associated with one or more transaction categories. In one embodiment, the transaction analysis engine 328 identifies transaction categories to associate with transactions. Associating transaction categories provides context for various transactions, allowing a user to obtain more information by analyzing the transaction categories. Examples of transaction categories include: groceries, dining, entertainment, clothing, utilities, fuel, vehicle repair, loan repayment, rent, mortgage, travel, hobbies, sporting events, deposits, investments, vacation, tuition, or any other suitable description. In one embodiment, a transaction category may include one or more sub-categories to provide additional information describing transactions. A transaction may be associated with more than one transaction category. For example, a transaction identifying a purchase at an exclusive wine store may be associated with a grocery category as well as an entertainment category. In one embodiment, the grocery characterization can be further characterized as either a discretionary or alcohol purchase.

The transaction analysis engine 328 may use a variety of methods to associate transaction categories with transactions. For example, the financial account provider 216 provides information describing transactions in a transaction history and the transaction analysis engine 328 maps this information to one or more transaction categories. The transaction analysis engine 328 may include data for mapping information describing a transaction to a category. For example, the transaction analysis engine 328 includes a table associating vendor identifiers with transaction categories and uses a vendor identifier extracted from a transaction to associate the transaction with a transaction category. In one embodiment, users of the social networking system may associate vendor identifiers with transaction categories and store the association, or associations, in the user profile store 304 or in the financial account store 324. Hence, a user associated with a transaction history is identified, and transaction categories are associated with transactions based on associations between vendor identifiers in the transactions and transaction categories stored by the user. Alternatively, the user may manually specify a category for transactions or respond to prompts from the transaction analysis engine 328 to associate transactions with transaction categories. In other implementations, the transaction analysis engine 328 uses keywords to associate transactions with transaction categories based on keywords in a vendor name associated with a transaction or in a description of the transaction.

Alternatively, the financial account provider 216 associates transaction categories with transactions based on information describing one or more of: an entity involved in the transaction, a good or service involved in the transaction, a transaction code describing the transaction, stored information about an entity involved in the transaction, or any other suitable information. The transaction history provided by the financial account provider 216 to the social networking system identifies transaction categories and transactions associated with various transaction categories. In another implementation, the user provides input associating a transaction category with a transaction to the financial account provider 216, and the transaction analysis engine 328 associates transactions with transaction categories based on the user-provided input.

The transaction analysis engine 328 also identifies a group of users for which transaction histories are retrieved and compared with a transaction history associated with a user. To provide the user with more relevant information, the transaction analysis engine 328 uses information stored in one or more of the user profile store 304, the action log 316, and the edge store 320 to select the group of users so that the group includes users having characteristics in common with the user. For example, the group is selected so that each user in the group has at least a threshold number of characteristics in common with the user. In another example, the group of users is selected based on a default setting that includes the user's own user profile characteristics. The user can change these default settings to other characteristics or exclude some of the characteristics from the analysis. For example, a user may exclude the characteristic of his birth city if the user believes that particular characteristic not relevant to the analysis.

In an example of the transaction analysis engine 328, the user can define the group of users for which transaction histories are retrieved. The selection of the group by the user can be facilitated by providing the user with a selection of characteristics from the user profile store 304, the action log 316, the edge store 320, and the financial account store 324. In this way, the user may define the group of users with any combination or sub-combination of characteristics that are of interest. Alternatively, the user can be provided with characteristics for selection even if the user does not share that characteristic. This may be particularly informative for users using the information for research. For example, if a user currently lives in San Francisco but is moving to New York, the user may select characteristics for a group of users living in New York in order to anticipate his own financial transactions upon moving.

When a user requests analysis of its transaction history, the transaction analysis engine 328 accesses the user profile store 304, the edge store 320 and/or the action log 316 to retrieve characteristics associated with the user. Examples of user characteristics include: demographic information, interests, connections to other users or objects, actions performed, or other suitable information. The retrieved characteristics may be presented to the user and one or more of the characteristics selected. Based on information in the user profile store 304, the action log 316 and/or the edge store 320, the transaction analysis engine 328 identifies users associated with at least a threshold number of the selected characteristics. Transaction histories for the identified users are retrieved and analyzed, as further described below, and used for comparison with the transaction history associated with the user. Alternatively, the transaction analysis engine 328 selects one or more characteristics associated with the user from the user profile store 304, the action log 316 and/or the edge store 320 and uses the selected characteristics to identify additional users and their transaction histories. This increases the likelihood that the users in the group of users are relevant to a user, increasing the relevance of the comparison to the user's transaction history to the transaction histories of the other users in the group of users.

Examples of demographic characteristics for selecting the group of users include: age, age range, gender, marital status, family size, current city or state of residence, education level, occupation, or other suitable information. Examples of non-demographic information for selecting users in the group of users include: interests, hobbies, and prior employment types or locations. Connections between the user and other users, or between the user and objects, as well as the type of connections between the user and other users or objects may also be used to select the group of users. For example, the group of users includes users having a connection to an object or other user to which the user is connected or includes users connected to an object or other user by a type of connection matching a type of connection between the user and the object or other user. Using connections to users and/or objects to select the group of users allows the user's transaction history to be compared to other users to which the user is connected or other users having a similar group of connections as the user.

Additionally, actions stored in the action log 316 as associated with users may be used to identify users in the group of users. For example, the group of users includes users performing a specified type of action, interacting with a specified type of object, or performing a specified type of action to a specified object. Actions from the action log 316 may also be used to infer interests of the user, and the inferred interests may be used to select users for the group of users having a matching or similar interest Using information about users stored by the user profile store 304, the action log 316 and/or the edge store 320 allows analysis of the user's transaction history to provide insights and/or correlations between the user's transactions and transactions of other users that are unable to be identified by conventional polling or financial analysis techniques. Hence, the quantity and diversity of data maintained about users by the social networking system allows the group of users to which the user's transactions are compared to be selected or refined in ways that are not possible outside of the social networking system 204.

In one embodiment, the user specifies one or more transaction categories to be compared to the group of users. Alternatively, the transaction analysis engine 328 selects one or more truncation categories for comparison. For example, the transaction analysis engines selects transaction categories associated with the highest amounts, associated with at least a threshold amount, associated with transactions occurring with at least a threshold frequency, or associated with any other suitable characteristic. The user's affinity for entities, such as merchants, associated with transaction categories may be used by the transaction analysis engine 328 to select transaction categories. Other information, such as the popularity of transaction categories, may be used to select transaction categories.

Transaction histories associated with users in the group of users are retrieved from the financial account store 324, from the user profile store 304, or from the financial account provider 216 and analyzed by the transaction analysis engine 328. As further described below in conjunction with FIG. 4, the transactions from the user's transaction history are compared to the analyzed transactions from the transaction histories of the users in the group of users. The comparison results are presented to the user, as described above in conjunction with FIG. 1. For example, the average transaction amount of users in the group of users in a transaction category is determined and compared to the user's transaction amount in the transaction category.

Additionally, the transaction analysis engine 328 may recommend a budget amount for a transaction category to the user. As further described below in conjunction with FIG. 5, a user identifies a transaction category and the transaction analysis engine 328 selects one or more supplemental transaction categories from the user's transaction history. Transaction amounts associated with one or more of the supplemental transaction categories are determined from the user's transaction history. Transaction histories for other users in the group of other users are retrieved and transaction amounts associated with the supplemental transaction categories are determined from the transaction histories for the other users. Transaction histories for other users including transaction amounts associated with the supplemental transaction categories within a threshold amount of the transaction amounts associated with the supplemental transaction categories from the user's transaction history are identified. A budget amount is determined from the transaction amounts associated with the identified transaction category in the transaction histories for the additional users and presented.

For situations in which the financial account provider 216 provides information describing the product that was the subject of the financial transaction, the transaction analysis engine 328 may use the information to identify products that may be of interest to the user. One example of this method is described below in FIG. 6.

The web server 332 links the social networking system 204 via the network 220 to the user device 208 and/or to the financial account provider 216. The web server 332 serves web pages, as well as other web-related content, such as JAVA®, FLASH®, XML and so forth. The web server 332 may provide the functionality of receiving and routing messages between the social networking system 204 and the user device 208, for example, instant messages, queued messages (e.g., email), text and SMS (short message service) messages, or messages sent using any other suitable messaging technique. A user may send a request to the web server 332 to upload information, for example, images or videos that are stored in the content store 308. Additionally, the web server 332 may provide application programming interface (API) functionality to send data directly to native client device operating systems, such as IOS®, ANDROID™, WEBOS® or RIM. The web server 332 also provides API functionality for exchanging data, such as financial account information, between the social networking system 204 and the financial account provider 216.

Analyzing a Social Networking System User's Transaction History

Figure 4:
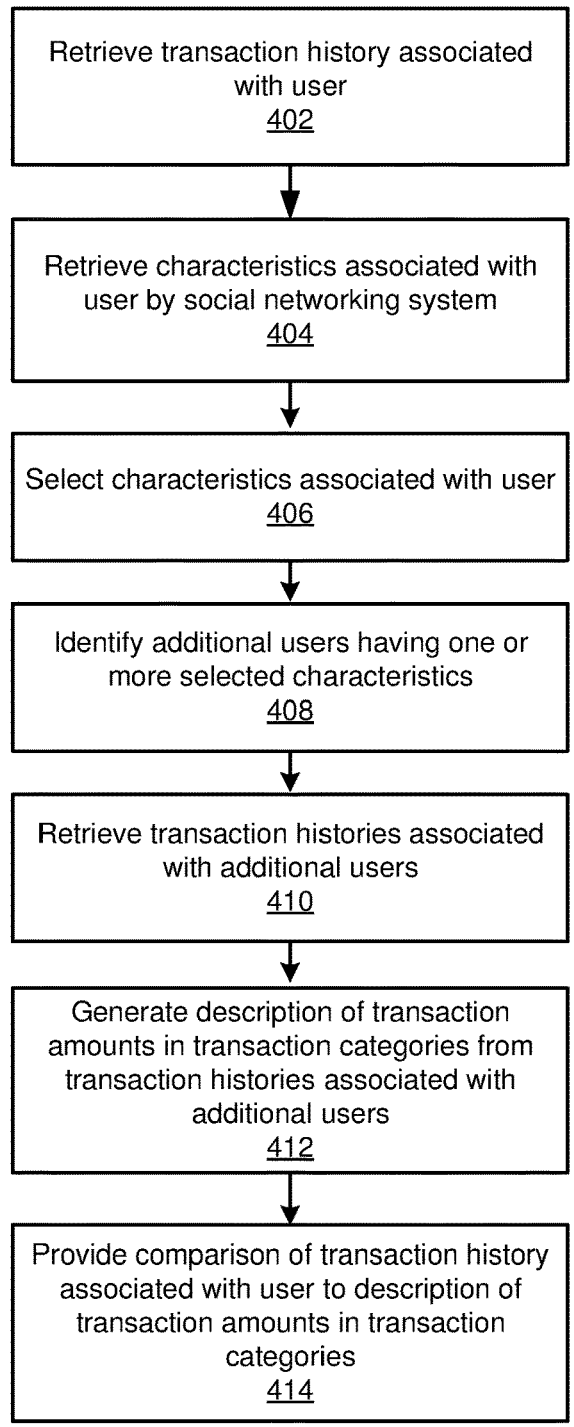
FIG. 4 is a flow chart of a method for comparing a social networking system user's financial transactions to financial transactions of a group of social networking system users, in an embodiment of the invention.

FIG. 4 shows a flow chart of a method 400 for comparing a social networking system user's financial transactions to financial transactions of a group of social networking system users. As described above, the transaction analysis module 328 retrieves 402 a transaction history associated with a user from a financial account provider 216, a financial account store 324 or a user profile store 304. In one embodiment, the user specifies a time range for the transaction history, so that transactions within the specified time range are retrieved 402. The transaction analysis engine 328 may also retrieve 402 a portion of the transaction history including transactions occurring within a default time range.

Characteristics associated with the user are retrieved 404 from the user profile store 304, the action log 316 and/or the edge store 320 by the transaction analysis engine 328. For example, demographic information, such as age, gender, geographic location, income level, and occupation, is retrieved from the user profile store 304. Connections between the user and other users or objects may be retrieved 404 from the edge store 320, and/or actions performed by the user may be retrieved 404 from the action log 316.

One or more of the retrieved characteristics associated with the user are selected 406. In one embodiment, the user selects 406 characteristics via input to the social networking system 204. Alternatively, the transaction analysis engine 328 selects 406 one or more characteristics. For example, the transaction analysis engine 328 selects 406 a set of demographic characteristics based on information about the user, such as the recency of different demographic information, a weighting associated with various demographic (or other) information by the transaction analysis engine 328, or any other suitable criteria.

Using the selected characteristics, the transaction analysis engine 328 accesses user profiles for other social networking system users from the user profile store 304 and identifies 408 additional users having one or more of the selected characteristics or having characteristics associated with one or more of the selected characteristics. In one embodiment, the transaction analysis engine 328 identifies 408 additional users having at least a threshold number of characteristics matching selected characteristics. Additionally, the transaction analysis engine 328 may also access information associated with other social networking system users from the edge store 320 and/or the action log 316 to identify 408 additional users having characteristics matching, or associated with, the selected characteristics.

Transaction histories associated with the identified users having characteristics matching, or associated with, the selected characteristics are retrieved 410 from a financial account provider 216, the financial account store 324 or from the user profile store 304. The transaction histories associated with the identified users are analyzed to generate 412 a description of transaction amounts associated with one or more transaction categories. For example, an average transaction amount for a transaction category is generated 412 from the transaction amounts for the category in the transaction histories for the identified users. Alternatively, a median or mode transaction amount for a transaction category may be generated from the transaction histories for the identified users. Other suitable analyses may be performed on the transaction histories for the identified users.

A comparison of the user's transaction history to the description of the transaction amounts is provided 414 to the user. For example, a graph showing transaction amounts for one or more categories from the transaction history of the user is presented 414 along with a graph showing the description of the transaction amounts from the transaction histories associated with the identified users. Alternatively, differences between the transaction amounts for transaction categories from the user's transaction history and the description of the transaction amounts for transaction categories from the transaction histories associated with the identified users is presented 414. Presentation of the comparison is further described above in conjunction with FIG. 1.

Figure 5:
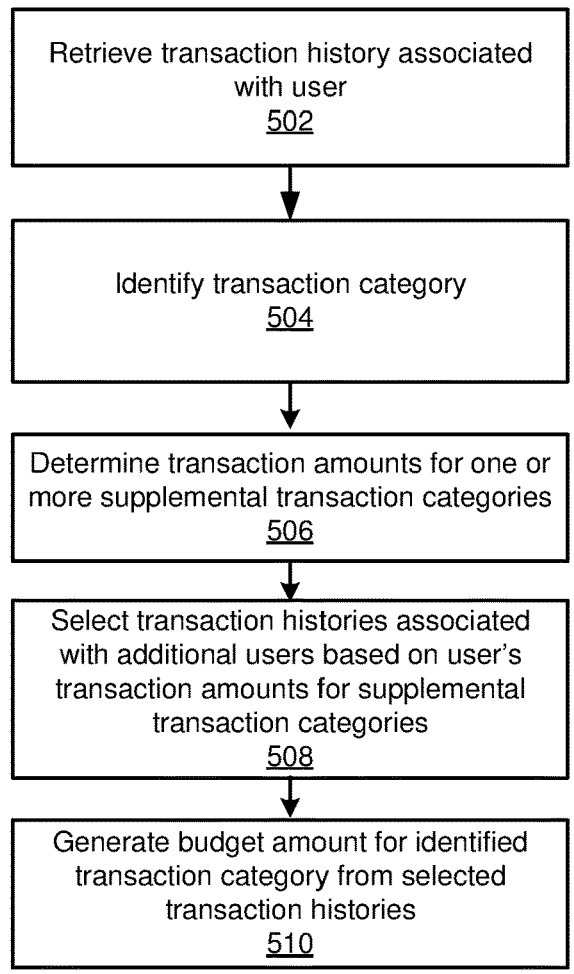
FIG. 5 is a flow chart of a method for determining a budget amount for a transaction category to a social networking system user, in an embodiment of the invention.

FIG. 5 shows a flow chart of one embodiment of a method 500 for determining a budget amount for a transaction category to a social networking system user. As described above in conjunction with FIG. 4, a transaction history associated with the user is retrieved 502 by the transaction analysis engine 328. The user identifies 504 at least one transaction category. For example, the user identifies 504 a transaction category for which the user would like to specify a budget amount.

The transaction analysis module 328 determines 506 transaction amounts for one or more supplemental transaction categories from the user's transaction history. In one embodiment, the supplemental transaction categories are specified by the transaction analysis module 328 based on one or more factors. For example, the transaction analysis engine 328 selects supplemental transaction categories where at least a threshold number of users have transactions associated with the supplemental transaction categories. Alternatively, the user specifies the supplemental transaction categories to the transaction analysis engine 328.

Using the transaction amounts for the one or more supplemental transaction categories, the transaction analysis engine 328 selects 508 transaction histories associated with additional social networking system users. For example, the transaction analysis engine 328 selects 508 transaction histories associated with additional users having transaction amounts for the one or more supplemental transaction categories within a threshold amount of the transaction amounts for the one or more supplemental transaction categories from the user's transaction history. As another example, the transaction analysis engine 328 selects 508 transaction histories associated with additional users that include at least a threshold number of transaction amounts in the supplemental transaction categories within a threshold of the transaction amounts for the user in the supplemental transaction categories.

Based on the transaction amounts associated with the identified transaction category in the selected transaction histories for the additional users, the transaction analysis module 328 generates 510 a budget amount for the identified transaction category. For example, the budget amount is the mean, median or mode of the transaction amounts for the identified transaction category from the selected transaction histories for the additional users. However, the budget amount may be generated in any suitable manner from the transaction amounts for the identified transaction category from the selected transaction histories for the additional users. For example the budget amount can be set, or even adjusted by the user, at a particular percentile of a distribution of spending for the transaction category. That is, the user can set a budget amount at the 80th percentile of a spending distribution for one transaction category and the 10th percentile in another transaction category to reflect the individual spending priorities of the user.

Furthermore, upon identifying a budget for one or more transaction categories, the user can, subject to any privacy settings, share the budget amounts for the categories with other users of the social networking system. This can help the user meet the budgeted amount by enabling other users of the social network to see the budget amount and comment on it (and the progress toward the budget amount), thereby providing social pressure to the user.

Identifying Products of Interest Using Transaction Analysis

Figure 6:
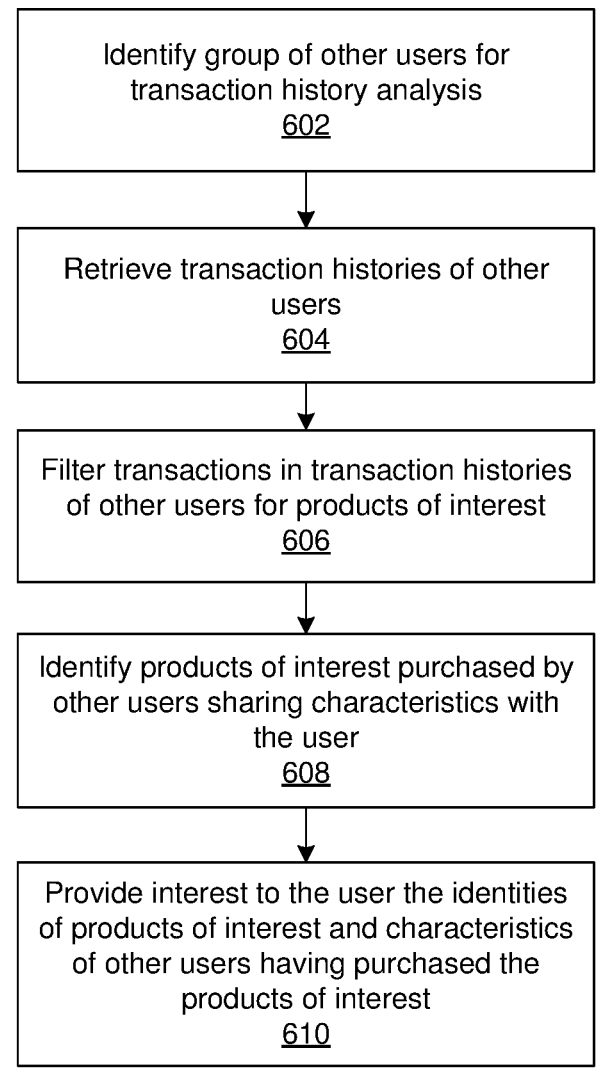
FIG. 6 is a flow chart of a method for notifying a user of products that may be of interest to the user and that are identified using financial transactions of a group of social networking system users and related social objects, in accordance with an embodiment of the invention.

As shown in FIG. 6, not only can the methods and systems described herein be used to compare a user's financial transactions to those of one or more groups of other users, but they can also be used to identify products that may be of interests to the user. Example method 600 is method process for identifying products of interest to the user by analyzing transaction histories of the user and/or other users. The method 600 begins by first identifying 602 a group of other users that may have characteristics similar to, or of interest to, the user. Identifying 602 this group of other users can be accomplished using any of the above described techniques including, but not limited to, the above description of the transaction analysis engine 328. Upon defining the characteristics used to select the other users to include in the group, the transaction histories of the identified other users are retrieved 604.

Furthermore, as described above, the user can select the characteristics defining the group of other users, including characteristics not shared by the user. For example, the user may want to know brands of clothing worn by residents sharing a hobby but living in a different city and having a different educational level. The use of groups or sub-groups is limited in some examples to those having a population above a minimum number. This minimum number can be determined statistically or selected using other criteria.

The retrieved 604 financial transaction histories of the other users are then analyzed to determine whether patterns emerge as to products of interest among the user of the group. For example, products purchased routinely can be excluded from this analysis by filtering 606. In one embodiment of this example, car repairs and food staples can be filtered 606, thereby excluding them from the analysis. These specific products and/or types of products can be filtered upon selection by the user or by the social networking system 204. The user may also filter specific products and/or types of products according to one or more privacy settings.

Products of interest are then identified 608 by determining a purchasing frequency or purchasing rate among the group of other users, or among various subgroups of the other users sharing characteristics with the user. For example, the purchase of a recent digital camera can be identified as occurring within 30% of the other users sharing with the user characteristics of city of residence and education level. Increasingly detailed characteristic information can be used to identify a product of interest. For example, of the above mentioned 30% of other users having purchased the digital camera, 50% share marital status, age, and income level with the user.

By identifying 608 products purchased by other users from their transaction histories, and further identifying the products purchased by the other users sharing characteristics with the user, increasingly relevant product information is provided 610 to the user. The social component of the products of interest need not only be used to identify 608 products of interest to the user. The characteristics describing the other users can be provided to the user along with the identity of the products purchased. For example, the user is provided 610 with the identity of the digital camera and the information that "30% of other users in your city with your degree of a Ph.D. in chemical physics purchased this camera." The user can be further informed that "Half of the Ph.D chemical physicists in your city that purchased the camera also are also married, are about your age, and make about your salary." The benefit of providing 610 this level of detail to the user that the user is informed about the transaction level purchasing habits of a relevant peer group for products that the user may find interesting. This increases the credibility and relevancy of the recommended product.

Additional transaction data can be provided to the user as available from the transaction histories and characteristics of the other users. For example, the distribution of the various purchase locations or vendors of the product, the purchase of equivalent products (recently developed mobile phone A compared to another recently developed mobile phone B), the behavior of equivalent groups (e.g., alumni of school A in the same tier as school B). As with the above examples, this information can be provided to the user with increasing detail regarding the characteristics shared between the user and the other users and/or their equivalents. Furthermore, the characteristics can be provided in any combination (e.g., product of interest, level of education of purchaser, the purchase location, and/or their equivalents). Other analogous examples of using data from the open social graph to enrich product recommendations are possible.

Furthermore, the financial transaction and user characteristic analysis can be further combined with information from the open social graph to provide further detail and relevance. For example, the use of the products of interest identified by method 600 can be correlated with data provided to the open social graph by user of the social networking system 204. Continuing with the example of the digital camera, the frequency of use of the camera by the variously identified groups can be measured using meta-data of images posted to the open social graph. The user can then be provided with not only the above information that 30% of Ph.D. chemical physicists in his city of residence purchased camera A, but 90% of that group has used the camera every day for two months.

The method 600 shown is only one example. In another example, the method can begin by first identifying products of interest based on social signals (e.g., endorsements, comments, presence on "wish lists," tags in user posts, reviews, and engagement of links to product pages) and then filtering the products by purchaser characteristic. In this way, the products of interest to all users are first identified and then limited to those products of interest to users sharing characteristics with the user. Other variations of method 600 are also possible while achieving the same result of identifying products of interest to the user based on analyzed financial transaction histories of social networking system users. For example, meta data of products that are in communication with the social networking system can be used to identify products used frequently, and products used frequently by users having one or more characteristics in common with the user.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
maintaining, by an online system, a plurality of user profiles for users of the online system;
maintaining, by the online system, a plurality of objects and edge objects in a social graph, the edge objects describing connections between the plurality of user profiles and the plurality of objects in the online system;
retrieving transaction history data associated with a user of the online system from one or more computing devices of a financial account provider system maintaining a financial account for the user, the transaction history data including information for a plurality of transactions, each transaction having a transaction amount and associated with at least one transaction category;
identifying, by the online system, one or more objects of the plurality of objects maintained by the online system from the transaction history data, each of the one or more objects associated with at least one of the plurality of transactions;
generating, by the online system, one or more edge objects in the social graph between a user profile of the user and the one or more objects associated with the plurality of transactions;
querying, by edge object type corresponding to transaction category, the social graph for the user associated with the plurality of transactions to identify a frequency of transactions within each of the at least one transaction category associated with the user, the frequency of transactions within each of the at least one transaction category based on the plurality of transactions;
identifying a subset of users of the online system connected to the user based at least in part on the user of the user;
retrieving, by the online system, transaction history data for the identified subset of users, the transaction history data received from at least one financial account provider system maintaining at least one financial account associated with at least one of the subset of users, the transaction history data including a plurality of transactions, each transaction having a transaction amount and associated with at least one transaction category;
querying, by edge object type corresponding to transaction category, the social graph for the identified subset of users connected to the user, the queried edge objects being associated with the plurality of transactions from the social graph and allowing the social networking system to identify a frequency for the plurality of transactions associated with the identified subset of users within each of the at least one transaction category; and
providing, to a computing device of the user for display by the online system, a transaction history comparison between the user and the subset of users.

2. The computer-implemented method of claim 1, wherein identifying subset of users of the online system based at least in part on the user profile of the user comprises:
- selecting one or more characteristics associated with the user from the user profile; and
- selecting user profiles associated with the subset of users of the online system having at least a threshold number of characteristics matching the selected one or more characteristics associated with the user.

3. The computer-implemented method of claim 2, wherein the one or more characteristics associated with the user are selected from a group consisting of: demographic information, interests, connections to other users or objects maintained by the online system, actions performed, and any combination thereof.

4. The computer-implemented method of claim 2, wherein selecting one or more characteristics associated with the user from the user profile comprises:
- receiving an input from the user selecting the one or more characteristics associated with the user.

5. The computer-implemented method of claim 1, wherein generating the description of transaction amounts in the at least one transaction category from the transaction history data associated with the identified subset of users comprises:
- calculating an average transaction amount for a transaction category from transaction amounts for the transaction category in the transaction history data associated with the identified subset of users.

6. The computer-implemented method of claim 1, wherein generating the description of transaction amounts in the at least one transaction category from the transaction history data associated with the identified subset of users comprises:
- calculating a median transaction amount for a transaction category from transaction amounts for the transaction category in the transaction history data associated with the identified subset of users.

\* \* \* \* \*